US007832627B2

(12) United States Patent
Sharma et al.

(10) Patent No.: US 7,832,627 B2
(45) Date of Patent: Nov. 16, 2010

(54) SYSTEM AND METHOD FOR CANCELING ELECTRONICALLY DEPOSITED CHECKS

(75) Inventors: Megha Sharma, Milford, CT (US); Jeffrey D. Pierce, Sandy Hook, CT (US); David B. Wilk, Clinton, CT (US); Jay Reichelsheimer, Shelton, CT (US)

(73) Assignee: Pitney Bowes Inc., Stamford, CT (US)

(*) Notice: Subject to any disclaimer, the term of this patent is extended or adjusted under 35 U.S.C. 154(b) by 1119 days.

(21) Appl. No.: 11/413,458

(22) Filed: Apr. 28, 2006

(65) Prior Publication Data

US 2007/0251992 A1 Nov. 1, 2007

(51) Int. Cl.
*G06Q 40/00* (2006.01)

(52) U.S. Cl. ........................................ 235/379

(58) Field of Classification Search .................. 235/379
See application file for complete search history.

(56) References Cited

U.S. PATENT DOCUMENTS 5,237,394 A * 8/1993 Eaton ........................ 356/402
6,201,234 B1 * 3/2001 Chow et al. ............ 250/214 LS
6,415,336 B1 * 7/2002 Sansone ........................ 710/5
7,000,828 B2 * 2/2006 Jones ........................ 235/379
7,137,551 B1 11/2006 Crews et al. ................ 235/379
7,438,219 B1 * 10/2008 Crews et al. ................ 235/379
2003/0009420 A1 * 1/2003 Jones ........................ 705/39
2004/0262121 A1 * 12/2004 Chien et al. ................ 194/207
2006/0202023 A1 * 9/2006 VanKirk et al. ............ 235/379
2006/0261155 A1 * 11/2006 Templeton et al. .......... 235/380

* cited by examiner

*Primary Examiner*—Daniel A Hess
*Assistant Examiner*—David Tardif
(74) *Attorney, Agent, or Firm*—George M. Macdonald; Angelo N. Chaclas

(57) ABSTRACT

A method of processing a check prior to electronically depositing the check includes steps of (a) attempting to print a cancellation mark on the check using an energy emitting ink, such as a luminescent ink, (b) radiating first energy, such as UV energy, toward the check, (c) determining whether second energy is emitted from the check as a result of the radiated first energy impinging upon the energy emitting ink present on the check, and (d) allowing the check to proceed to electronic deposit only if it is determined that the second energy is emitted from the check. Also, an apparatus for electronically depositing a check that implements the method.

16 Claims, 5 Drawing Sheets

100 TRANSPORT THE CHECK ALONG THE FEED PATH OF THE CHECK SCANNING DEVICE

105 DIRECT THE RADIANT ENERGY TOWARD THE CHECK AND RECEIVE THE LIGHT SIGNAL, IF ANY, AT THE PHOTO DETECTOR

110 DOES THE RECEIVED LIGHT SIGNAL INDICATE A PROPER CANCELLATION MARKING ?

YES

145 SCAN THE CHECK TO CREATE AN ELECTRONIC IMAGE

NO

115 SCAN THE CHECK TO CREATE AN ELECTRONIC IMAGE

120 ATTEMPT TO PRINT A PROPER CANCELLATION MARKING

125 DIRECT THE RADIANT ENERGY TOWARD THE CHECK AND RECEIVE THE LIGHT SIGNAL, IF ANY, AT THE PHOTO DETECTOR

130 DOES THE RECEIVED LIGHT SIGNAL INDICATE A PROPER CANCELLATION MARKING ?

NO

135 ERROR

YES

140 PROCEED WITH ELECTRONIC DEPOSIT OF CHECK

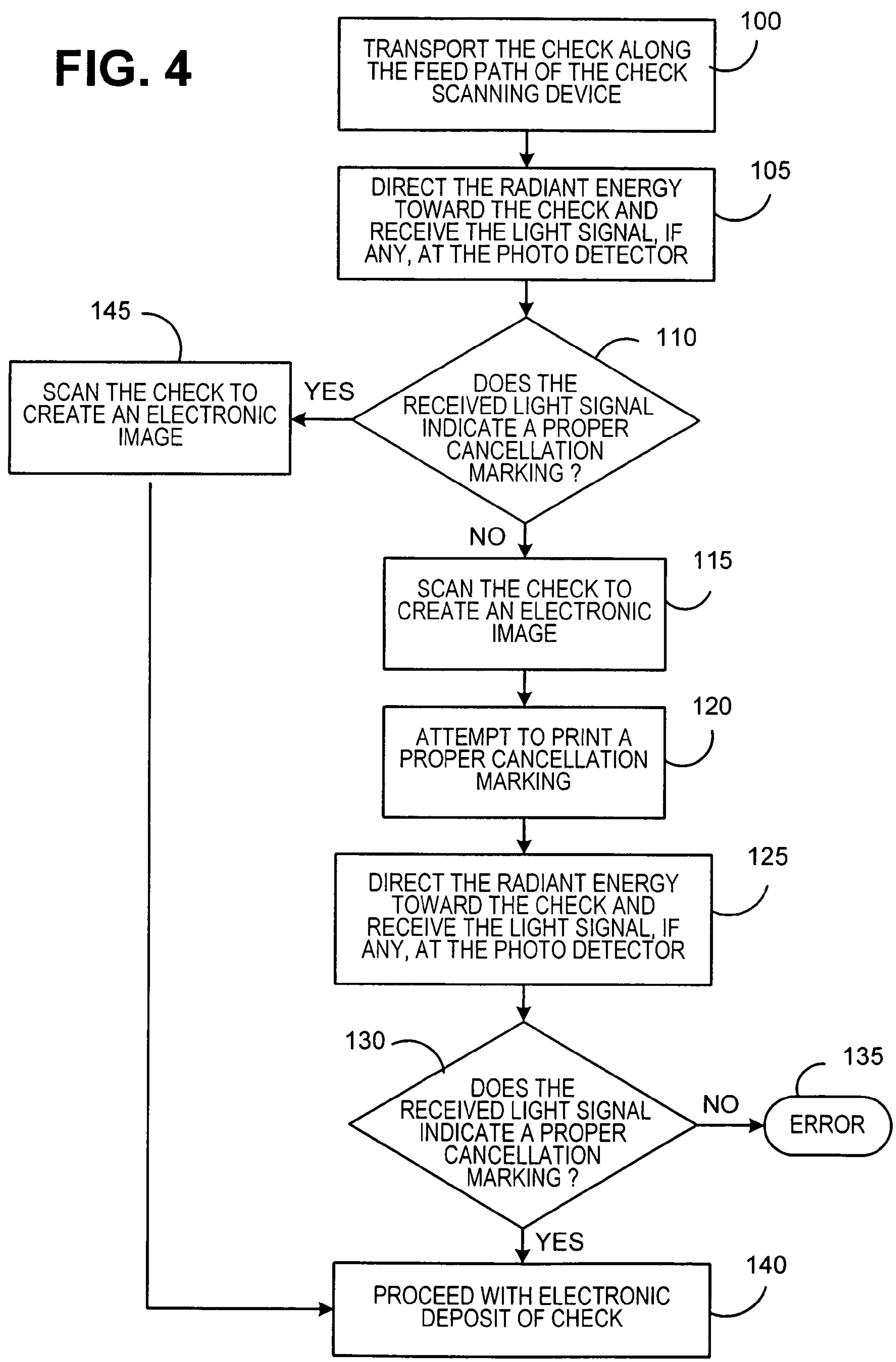
FIG. 4
TRANSPORT THE CHECK ALONG THE FEED PATH OF THE CHECK SCANNING DEVICE
100
DIRECT THE RADIANT ENERGY TOWARD THE CHECK AND RECEIVE THE LIGHT SIGNAL, IF ANY, AT THE PHOTO DETECTOR
105
DOES THE RECEIVED LIGHT SIGNAL INDICATE A PROPER CANCELLATION MARKING ?
110
YES
SCAN THE CHECK TO CREATE AN ELECTRONIC IMAGE
145
NO
SCAN THE CHECK TO CREATE AN ELECTRONIC IMAGE
115
ATTEMPT TO PRINT A PROPER CANCELLATION MARKING
120
DIRECT THE RADIANT ENERGY TOWARD THE CHECK AND RECEIVE THE LIGHT SIGNAL, IF ANY, AT THE PHOTO DETECTOR
125
DOES THE RECEIVED LIGHT SIGNAL INDICATE A PROPER CANCELLATION MARKING ?
130
NO
ERROR
135
YES
PROCEED WITH ELECTRONIC DEPOSIT OF CHECK
140

SYSTEM AND METHOD FOR CANCELING ELECTRONICALLY DEPOSITED CHECKS

CROSS-REFERENCE TO RELATED APPLICATION

This application is related to application Ser. No. 11/413,305, entitled "System And Method For Processing Electronically Deposited Checks" and filed contemporaneously herewith, which related application is incorporated herein by reference.

FIELD OF THE INVENTION

The present invention relates to check deposit systems, and in particular to a system and method for canceling checks during a remote check image capture and deposit process.

BACKGROUND OF THE INVENTION

Traditionally, businesses have deposited checks received from, for example, customers by physically taking the checks to a branch of their bank and depositing them over the counter with a teller or dropping them into a night deposit box. The actual physical presentation of checks to be deposited was necessary because, under prior banking laws, the depository bank had to present the original of each check to the corresponding paying bank in order to clear the check. This changed in October of 2004 with the enactment of The Check Clearing for the 21$^{st}$ Century Act, commonly referred to Check 21. Check 21 removed the legal requirement that an original paper check had to be presented to obtain payment. Instead, banks can now use digital images to transport check data from the bank of first deposit to the paying bank. If the paying bank cannot process a check image, the image can be printed, according to certain specifications, to create what is known as a substitute check, which is the legal equivalent of the original paper check. Check 21 has thus opened the door for remote check deposit solutions wherein check images, rather than original paper checks, are used to make deposits, thereby enabling businesses to eliminate trips to the bank. In addition, the use of check images also reduces check transportation costs among banks and improves funds availability.

In order to implement a remote check deposit solution, a depositor must have at their location a device that includes, at a minimum, a scanner and a secure network connection, such as a secure Internet connection. When the depositor wishes to make a deposit, an operator, such an accounts receivable clerk, scans each of the checks to be deposited and provides the dollar amount of each check, such as by keying the dollar amount into the device as each check is being scanned. Alternatively, the device may be provided with optical character recognition (OCR) software that is adapted to obtain the dollar amount of each check directly from the scanned image. In either case, once the images are created and the dollar amount of each check is obtained, that information is transmitted through the network (e.g., the Internet) either directly to the depository bank or to a third party service provider which in turn forwards the information on to the depository bank following some additional processing. Once the check images and corresponding information are received at the depository bank, they are used to make the appropriate deposits to the depositor's account.

While such systems add convenience for depositors and reduce the amount of, and thus the cost of, bank operator intervention, they do introduce the potential for fraud. For example, a depositor may attempt to deposit a single check multiple times by scanning and submitting it for deposit multiple times or by scanning it for electronic deposit and then subsequently attempting to redeposit it physically at a bank branch. Thus, there is a need for a remote check capture system and method that reduces the risk of fraud from multiple attempts to deposit the same check.

SUMMARY OF THE INVENTION

One embodiment of the invention relates to a method of processing a check prior to electronically depositing the check. The method includes steps of (a) attempting to print a cancellation mark on the check using an energy emitting ink, such as a luminescent ink (e.g., a fluorescent or phosphorescent ink), (b) radiating first energy, such as UV energy, toward the check, (c) determining whether second energy is emitted from the check as a result of the radiated first energy impinging upon the energy emitting ink present on the check, and (d) allowing the check to proceed to electronic deposit only if it is determined that the second energy is emitted from the check. Preferably, the determining step further includes determining whether the emitted second energy indicates that the cancellation mark has been successfully printed and the allowing step further comprises allowing the check to proceed to electronic deposit only if it is determined that the emitted second energy indicates that the cancellation mark has been successfully printed. This may be done by converting the emitted second energy into a voltage profile and comparing the profile to an expected profile that corresponds to the chosen cancellation mark. The method also preferably includes generating an electronic image of the check prior to step (a) and electronically transmitting at least the electronic image for electronically depositing the check following step (d).

In one particular embodiment, the method, prior to step (a), further includes steps to determine whether the check has already been canceled by radiating the first energy toward the check and determining whether third energy is emitted from the check as a result of the radiated first energy impinging upon the energy emitting ink present on said check. In this embodiment, steps (a) through (d) are performed only if it is determined that the third energy is not emitted from the check. In addition, if it is determined that the third energy is emitted from the check, the method further includes allowing the check to proceed to electronic deposit without attempting to print a cancellation mark on the check. Preferably, if it is determined that the third energy is emitted from the check, the method further includes determining whether the emitted third energy indicates that a particular cancellation mark has been previously printed on the check, wherein the check is allowed to proceed to electronic deposit without attempting to print a cancellation mark on the check only if it is determined that the emitted third energy indicates that the particular cancellation mark has been previously printed on the check. If it is determined that the third energy is emitted from the check, the method may further include allowing the check to proceed to electronic deposit with an indicator that the check is being resubmitted for electronic deposit.

Also provided is an apparatus for electronically depositing a check that includes a controller, a scanner in electronic communication with the controller for generating an electronic image of the check, a print head in electronic communication with the controller for printing an energy emitting ink, such as a luminescent ink, on the check, a sensor device in electronic communication with the controller that includes a radiant energy source, such as UV LED, for radiating first energy, such as UV radiation, and a memory in electronic communication with the controller. The memory includes one or more routines that are executable by the controller. The routines include instructions for implementing the various embodiments of the method described above.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

FIG. 4 is a flowchart that illustrates one embodiment of a method of operation of the check scanning device shown in FIG. 2.

DESCRIPTION OF THE PREFERRED EMBODIMENTS

Figure 1:
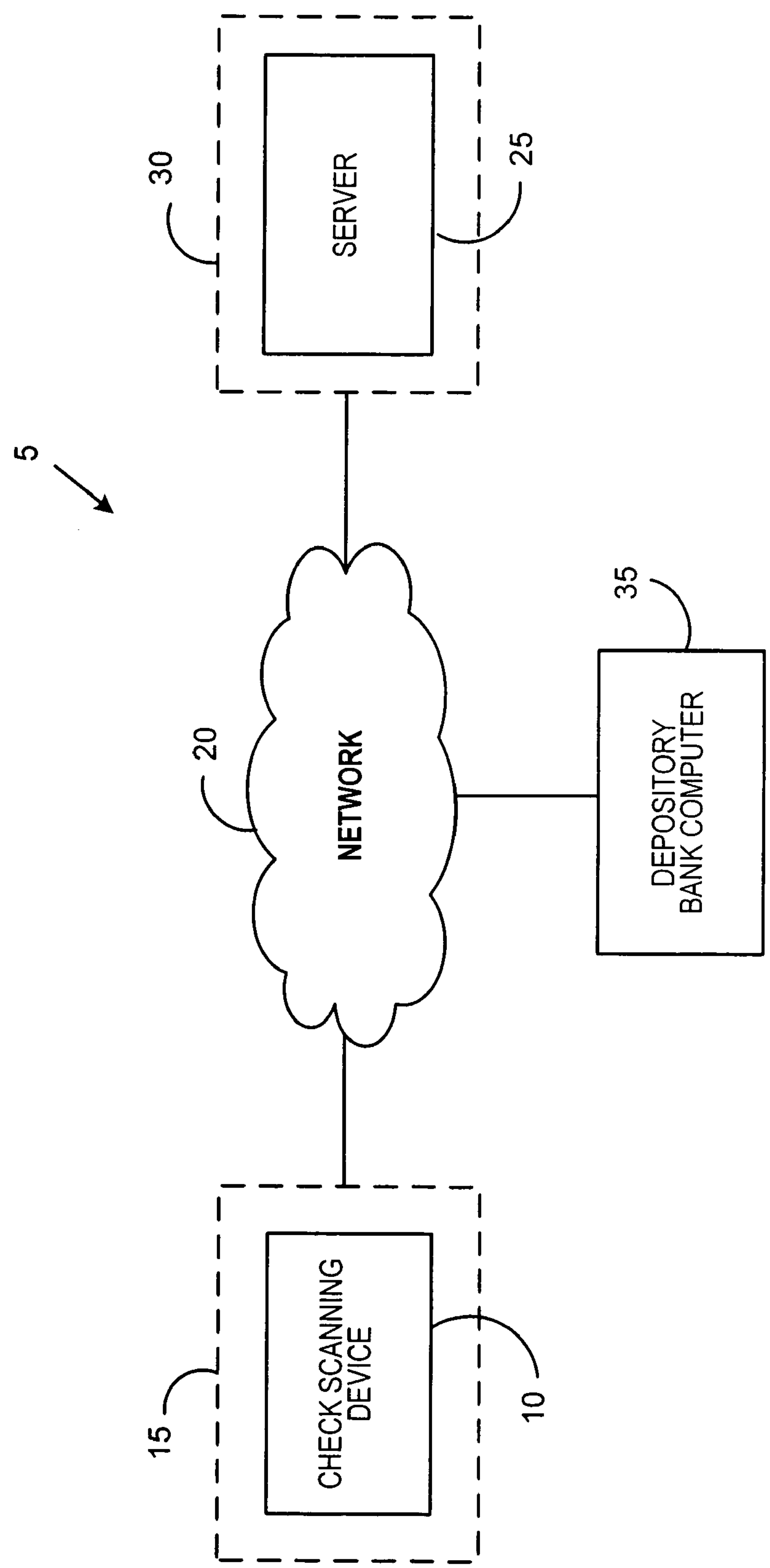
FIG. 1 is a block diagram of a remote check capture system according to an embodiment of the present invention.

FIG. 1 is a block diagram of a remote check capture system 5 according to an embodiment of the present invention. Remote check capture system 5 enables a depositor to remotely deposit a number of checks in a particular depository bank. Remote check capture system 5 includes a check scanning device 10 located at a depositor location 15 for scanning and thereby creating electronic images of the checks to be deposited. The check scanning device 10 is in secure electronic communication with a network 20, which may be, for example, the Internet, one or more private computer networks, or any combination thereof. Remote check capture system 5 further includes a server 25 located at a service provider location 30. The server 25 is also in secure electronic communication with the network 20. Finally, the remote check capture system 5 includes a depository bank computer 35, which is a computer designated by the depository bank to receive and process electronic deposit information. The service provider location 30 may be a facility operated by a third party service provider or a facility operated by the depository bank where the bank provides remote deposit services to its customers.

As described in further detail herein, a depositor feeds the checks to be deposited into the check scanning device 10, which in turn creates an image of each check. Those images, preferably also with dollar amount information either provided by the depositor or obtained automatically from the check images, are transmitted to the server 25 located at the service provider location 30 through the network 20. The role of the service provider operating the server 25 is to accumulate check images to be deposited and process them so that they can readily be sent to and deposited by the depository bank. Thus, the server 25 receives the images transmitted by the check scanning device 10, performs certain additional processing steps not relevant to the present description, and then forwards the images and associated information to the depository bank computer 35. Once the check images and corresponding information are received at by the depository bank computer 35 at the depository bank, they are used to make the appropriate deposits to the depositor's account.

Figure 2:
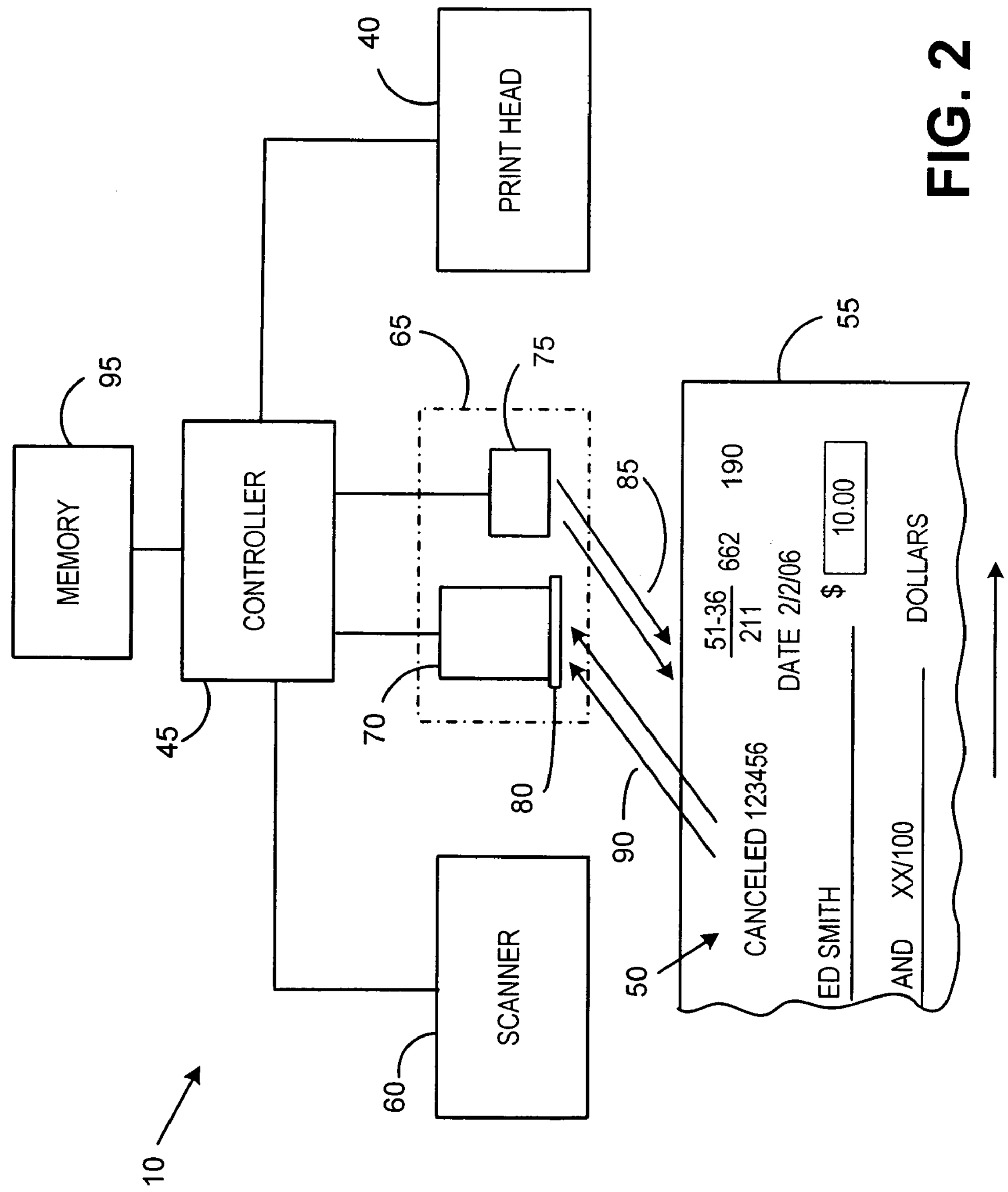
FIG. 2 is a schematic diagram of one embodiment of a check scanning device according to an aspect of the invention that may be employed in the remote check capture system shown in FIG. 1.

FIG. 2 is a schematic diagram of one embodiment of the check scanning device 10 according to an aspect of the invention. The check scanning device 10 includes a print head 40, such as, for example, an ink jet print head, that is connected to and under the control of a controller 45, such as, for example, a microprocessor or microcontroller. The print head 40 is adapted to print information 50 onto a check 55 that is fed into the check scanning device 40 that indicates, as described in further detail herein, that the check 55 has been canceled. As used herein, the term canceled means that the check 55 in question has been scanned and submitted for electronic deposit using the check scanning device 10 or a similar device. The check scanning device 10 further includes a scanner 60 that is connected to and under the control of the controller 45 for generating an electronic image of the check 55. A transport mechanism (not shown) for transporting the check 55 within the check scanning device 10 is also provided.

In the preferred embodiment, the print head 40 is adapted to print the information 50 with a luminescent ink, such as a fluorescent ink or a phosphorescent ink, using an ink jet printing method. Color fluorescent inks are known and are described in, for example, U.S. patent application publication nos. US 2002/0195586 A1, US 2003/0005303 A1, and US 2004/0041774 A1, the disclosures of which are incorporated herein by reference. The color fluorescent ink could be any suitable color including, for example, red or blue. Invisible luminescent ink jet inks may also be used and are described in U.S. Pat. No. 6,905,538, the disclosure of which is incorporated herein by reference. Such inks have been used to by government postal services, such as the USPS, to validate that a postage indicium is authentic. Such inks have also been used to place a mark on a postage indicium provided on a mailpiece to indicate that the postage value has been used. A system for detecting such a mark, which is similar to the detection system disclosed herein, is described in U.S. patent application publication no. US 2006/0044341 A1, the disclosure of which is incorporated herein by reference.

Referring again to FIG. 2, the check scanning device 10 also includes a luminescent ink sensor 65 located downstream from the print head 40. The function of the luminescent ink sensor 65 is to determine whether the information 50 has been printed on the check 55 that passes thereby. The luminescent ink sensor 65 is in electronic communication with and under the control of the controller 45 and includes a photodetector 70, a radiant energy source 75, and a filter 80. Any suitable photodetector device may be used for the photodetector 70, which generally comprises a light-to-voltage sensor. The radiant energy source 75 may generally comprise an ultraviolet (UV) light emitting diode (LED), although any suitable radiant energy source may also be used. The filter 80 is a wavelength filter, such as a high pass filter. Any suitable filter could be provided, such as a physical filter or a coating provided on an optical lens. The filter 80 is located between the path of travel of the check 55 and the photodetector 70.

The check scanning device 10 also includes a memory 95, which is coupled to or be a part of the controller 45. The memory 95 may be any of a variety of types of internal and/or external storage media such as, without limitation, RAM, ROM, EPROM(s), EEPROM(s), and the like that provide a storage register for data storage such as in the fashion of an internal storage area of a computer, and can be volatile memory or nonvolatile memory. The memory 95 stores routines that are executable by the controller 45 and that implement the functionality of the check scanning device 10 according to the various embodiments of the present invention as described herein.

Figure 3:
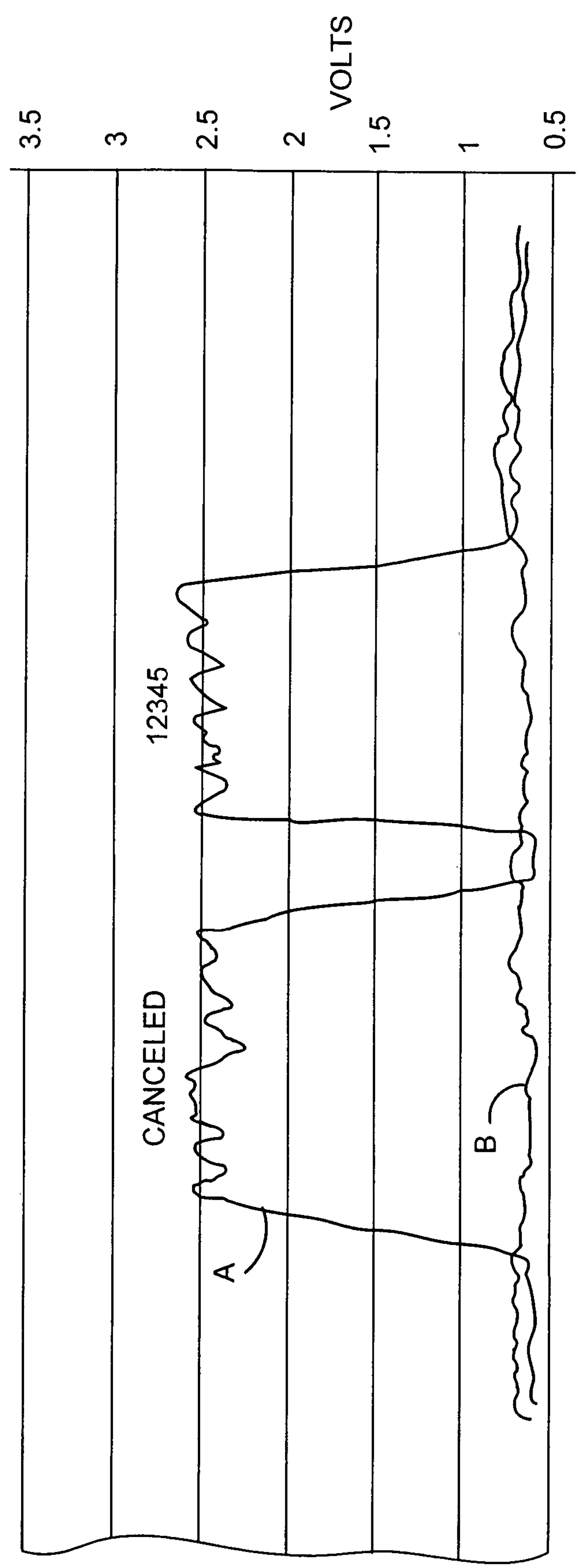
FIG. 3 depicts a sample output voltage profile that may be generated by the sensor device forming a part of the check scanning device shown in FIG. 2.

In operation, the radiant energy source 75 emits radiant energy 85 of a particular wavelength. The information 50, being printed with a luminescent ink, will transform the radiant energy 85 into a light signal 90 having a particular wavelength depending on the nature of the luminescent ink and the wavelength of the radiant energy 85. The light signal 90 will pass through the filter 80 and the resulting filtered signal will be absorbed by the photodetector 70, which converts it to an output voltage that is provided to the controller 45. As will be appreciated, with a given type of ink, the expected output voltage will be known. In addition, the nature of the waveform or profile of the output voltage will depend upon and correspond to the words or symbols included in the information 50. As a result, known words or symbols will generate relatively consistent, expected profiles. For example, the word “CANCELED” will, in response to the radiant energy 85, produce a particular light signal 90 which will result in an output voltage profile having a particular, generally consistent shape. That output voltage profile may, for example, take the shape of the profile A shown in FIG. 3, which is depicted along with a baseline (from the check stock) profile B.

Thus, the luminescent ink sensor 65 as just described may be used to detect whether the information 50 is in fact present on the check 55. In particular, if, in response to the radiant energy 85, an appropriate voltage profile (i.e., a profile having a particular shape and amplitude characteristics) is not generated by the photodetector 70, then that is an indication that the information 50 is not present on the check 55. Conversely, if, in response to the radiant energy 85, an appropriate voltage profile is generated by the photodetector 70 (in response to the light signal 90), then that is an indication that the information 50 is present on the check 55.

In one particular embodiment, the radiant energy source 75 is a ultraviolet (UV) LED that provides 410 nm light energy as the radiant energy 85, and the luminescent ink used to print the information 50 is a fluorescent ink that transforms 410 nm light into 600 nm orange light. In this embodiment, the filter 80 is a 550 nm or 600 nm high pass filter, and thus will only pass light having that wavelength or higher and will absorb lower wavelength light. In this way, the luminescent ink sensor 65 is adapted to detect 600 nm light. This is advantageous since many types of check stock include fluorescent fibers, and the filter 80 will prevent light from those fluorescent fibers from being absorbed by the photodetector 65.

Under certain circumstances, such as a problem encountered during scanning or during processing at the server 25, it may be necessary for a check that was previously scanned using the check scanning device 10, printed with the information 50 and submitted to the server 25 to be legitimately re-scanned and resubmitted. As will be appreciated, it such as case, it is not necessary or desirable to have the information 50 reprinted on the check when it is re-scanned and resubmitted. Thus, an aspect of the invention, described below, includes a mechanism for preventing the reprinting of the information 50 for checks being resubmitted.

FIG. 4 is a flowchart that illustrates a method of operation of the check scanning device 10 according to one embodiment of the invention. The method begins at step 100, where, after an operator of the check scanning device 10 has fed a check 55 to be deposited into the check scanning device 10, the check 55 is transported along the feed path of the check scanning device 10 to a location adjacent to the luminescent ink sensor 65. Next, at step 105, the radiant energy 85 is directed toward the check 55, and the light signal 90, if any, is received at the photodetector 70. At step 110, a determination is made as to whether the received light signal 90, if any, indicates a proper cancellation marking, such as the information 50 described above. If the answer at step 110 is yes, then, at step 115, the check 55 is transported to the scanner 60 and an electronic image of the check 55 is generated. Next, the check 55 is transported to the print head 40 and a print operation is initiated to attempt to properly print a designated cancellation marking, such as the information 50, onto the check 55 using a luminescent ink. As described above, the cancellation marking may consist of the word “CANCELED” or any other desired word, symbol, or combination thereof. In addition, each check that is processed may be assigned a unique identifier that is used to track the check while working its way through the remote check capture system 5, and that identifier may be printed as part of the cancellation marking. Then, at step 125, the radiant energy 85 is again directed toward the check 55, and the light signal 90, if any, is received at the photodetector 70. At step 130, a determination is made as to whether the received light signal 90, if any, indicates that a proper cancellation marking, such as the information 50, was properly printed. For example, a determination may be made as to whether the voltage output generated by the received light signal has an expected profile, such as a profile that corresponds to the word “CANCELED.” This is important to the present system because you do not want a check that has not been properly canceled to be able to continue in the remote check deposit process, since, as described elsewhere herein, an un-canceled check may be used fraudulently. The failure to print a proper cancellation marking may be due to both innocent reasons, such as the print head 40 running out of ink or the check 55 being misfed, or fraudulent reasons, such as the operator tampering with the check scanning device 10. Thus, if the answer at step 130 is no, then, at step 135, an error message is generated and the check 55 will not be allowed to proceed through the remainder check deposit process until some corrective action is taken. If, however, the answer at step 130 is yes, then, at step 140, the check 55 is allowed to proceed through the remainder check deposit process.

Returning to step 110, if the answer is yes, meaning that a cancellation marking is already on the check 55, then, at step 145, the check 55 is transported to the scanner 60 and an electronic image of the check 55 is created. Such a check, since it already has a cancellation marking on it, is a check that is being resubmitted as described above. Note that this portion of the method bypasses step 120 so that no attempt is made to print an additional cancellation marking on the check 55. Following step 145, the method proceeds to step 140, where the check 55 is allowed to proceed through the remainder check deposit process. For such a check (i.e., a check being resubmitted), steps will preferably be taken to ensure that it is only actually deposited once. For example, as noted elsewhere herein, the server 25 accumulates information for the checks being remotely deposited. In the case of re-submitted checks, that server 25 may replace any existing data is has accumulated for the check when it was previously submitted with the data accompanying the re-submitted version of the check. In the preferred embodiment, the unique identifier assigned to the check in question is used to facilitate this process, i.e., it is used to identify the relevant data at the server 25. Alternatively, the resubmitted check may be transmitted to the server with some type of data indicating that it is being resubmitted for deposit so that the server 25 can take the appropriate action.

Thus, the present invention provides a method and apparatus for ensuring that a check has been properly canceled before it is allowed to continue through the remote check deposit process, and/or for ensuring that a previously canceled check is not reprinted with a cancellation mark.

Figure 5:
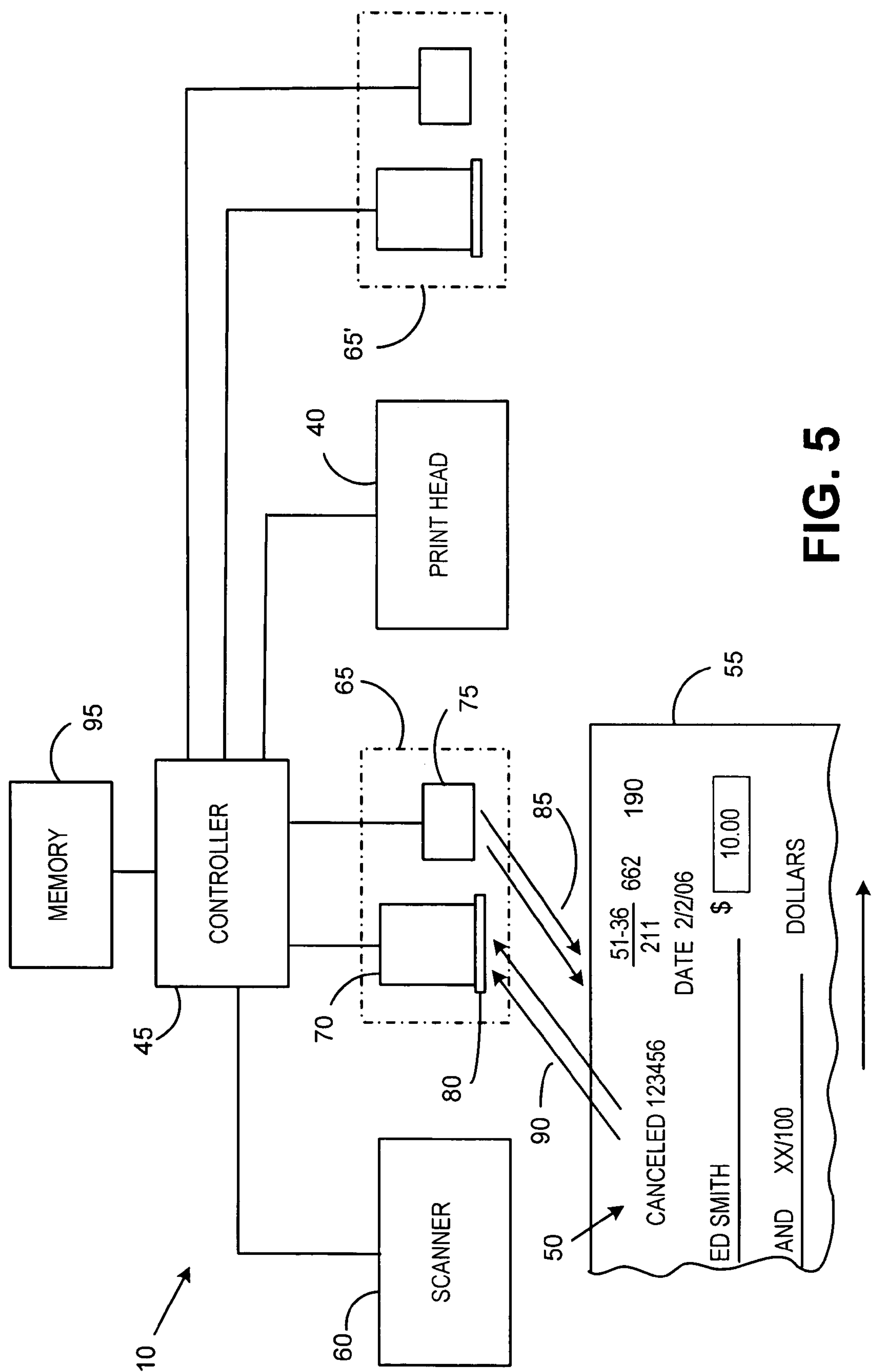
FIG. 5 is a schematic diagram of another embodiment of a check scanning device according to an aspect of the invention that may be employed in the remote check capture system shown in FIG. 1.

Referring to FIG. 5, an alternative embodiment similar to that of FIG. 2 is shown having a second sensor. An additional sensor 65' is placed after the printhead 40 as a security check for the device. The use of a second sensor 65' ensures that the device is functioning properly and that a proper cancellation mark has been placed on the Check. In the event of a failure of the inkjet printhead 40 the system controller 45 would determine that there was a failure and then shut down or take other appropriate action until maintenance is performed. This alternative would also protect against some counterfeit measures such as an attack wherein someone placed cellophane tape on the check. The ink from the printhead 40 would spit on the tape and blur creating a different response curve. Again that check image could be flagged internally watching for duplicates in the future.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. For example, while the embodiments described above utilize a luminescent ink (e.g., fluorescent or phosphorescent ink) to create the cancellation mark, it should be appreciated that other types of energy emitting ink may be used. As used herein, energy emitting ink means an ink that will emit a particular type of energy when a first energy impinges upon it. Such inks may include, without limitation, fluorescent, phosphorescent and magnetic inks or an ink having RF elements dispersed therein (RFID ink). Accordingly, the invention is not to be considered as limited by the foregoing description but is only limited by the scope of the appended claims.

What is claimed is:

1. A method of processing a check prior to electronically depositing the check using a system having a print head, a first sensor located upstream of the print head and a second sensor located downstream of the print head, comprising:

determining, using the first sensor, if a previous cancellation mark is present on the check;

if the previous cancellation mark is present on the check, then electronically depositing the check as a resubmitted check; and if the previous cancellation mark is not present on the check, then, (a) printing a cancellation mark on said check using the print head and an energy emitting ink;

(b) radiating first energy toward said check;

(c) determining, using the second sensor, whether second energy is emitted from said check as a result of said radiated first energy impinging upon said energy emitting ink present on said check; and (d) allowing said check to proceed to electronic deposit only if it is determined that said second energy associated with the cancellation mark is emitted from said check.

2. The method according to claim 1, wherein if it is determined that said second energy is emitted from said check, said determining step further comprises determining whether said emitted second energy indicates that said cancellation mark has been successfully printed and said allowing step further comprises allowing said check to proceed to electronic deposit only if it is determined that said emitted second energy indicates that said cancellation mark has been successfully printed.

3. The method according to claim 1, wherein said energy emitting ink is a luminescent ink.

4. The method according to claim 1, further comprising generating an electronic image of said check prior to step (a) and electronically transmitting at least said electronic image for electronically depositing said check following step (d).

5. The method according to claim 2, wherein the step of determining whether said emitted second energy indicates that said cancellation mark has been successfully printed comprises converting said emitted second energy into a voltage profile and determining whether said voltage profile substantially matches an expected voltage profile.

6. An apparatus for electronically depositing a check, comprising:

a controller;

a scanner in electronic communication with said controller for generating an electronic image of said check;

a print head in electronic communication with said controller for printing a cancellation mark using energy emitting ink on said check;

a first sensor device located upstream of the print head and in electronic communication with said controller, said sensor device having a radiant energy source for radiating first energy and detecting second energy associated with the energy emitting ink;

a second sensor device located downstream of the print head in electronic communication with said controller, said sensor device having a radiant energy source for radiating first energy and detecting second energy associated with the energy emitting ink; and a memory in electronic communication with said controller, said memory having one or more routines executable by said controller, said one or more routines including instructions for:

using the first sensor to determine if a previous cancellation mark is present on the check;

if the previous cancellation mark is present on the check, then electronically depositing the check as a resubmitted check including submitting data to a remote server indicating that the check has been resubmitted; and if the previous cancellation mark is not present on the check, then, (a) causing the print head to print a cancellation mark on said check using said energy emitting ink;

(b) causing the radiant energy source to radiate said first energy toward said check;

(c) determining whether second energy is emitted from said check and received by said second sensor device as a result of said radiated first energy impinging upon said energy emitting ink present on said check; and (d) allowing said check to proceed to electronic deposit only if it is determined that said second energy associated with the cancellation mark is emitted from said check.

7. The apparatus according to claim 6, wherein said first and second sensor devices include photodetectors.

8. The apparatus according to claim 7, wherein said energy emitting ink is a luminescent ink, wherein said radiant energy source comprises a UV LED, and wherein said first energy is UV radiation, and wherein said second energy is the energy emitted by the luminescent ink when radiated with the UV radiation.

9. The apparatus according to claim 6, wherein said allowing instructions allow said check to proceed to electronic deposit only if it is determined that said cancellation mark has been successfully printed.

10. The apparatus according to claim 9, wherein said second sensor device includes a photodetector for converting said emitted second energy into a voltage profile and wherein the instructions for determining whether said emitted second energy indicates that said cancellation mark has been successfully printed comprise instructions for determining whether said voltage profile substantially matches an expected voltage profile.

11. The apparatus according to claim 6, wherein, said first and second sensor devices include photodetectors;

said energy emitting ink is a luminescent ink, wherein said radiant energy source comprises a UV LED, and wherein said first energy is UV radiation, and wherein said second energy is the energy emitted by the luminescent ink when radiated with the UV radiation; and determining if a previous cancellation mark is present comprises determining if an expected voltage profile is present at the first sensor.

12. A method of processing a check prior to electronically depositing the check using a system having a print head, a first sensor located upstream of the print head and a second sensor located downstream of the print head, comprising:

radiating first energy toward said check and determining whether second energy associated with a previous cancellation mark printed with energy emitting ink is present on said check, using the first sensor;

if the previous cancellation mark is present on the check, then electronically depositing the check as a resubmitted check; and if the previous cancellation mark is not present on the check, then, (a) printing a cancellation mark on said check using the print head and an energy emitting ink;

(b) radiating first energy toward said check;

(c) determining, using the second sensor, whether the cancellation mark is present by determining whether second energy is emitted from said check as a result of said radiated first energy impinging upon said energy emitting ink present on said check; and (d) allowing said check to proceed to electronic deposit only if it is determined that said second energy associated with the cancellation mark is emitted from said check.

13. The method according to claim 12, wherein if it is determined that the previous cancellation mark is present on the check, said check is allowed to proceed to electronic deposit without attempting to print a cancellation mark on said check only if it is determined that the previous cancellation mark is a complete cancellation mark.

14. The method according to claim 12, wherein if it is determined that the previous cancellation mark is present on the check, the method further comprises allowing said check to proceed to electronic deposit as a resubmitted check with an indicator that said check is being resubmitted for electronic deposit.

15. The method according to claim 12, wherein the step of determining whether the previous cancellation mark is present on the check comprises converting emitted second energy into a voltage profile and determining whether said voltage profile substantially matches an expected voltage profile.

16. The method according to claim 12, wherein the step of determining whether the cancellation mark is present on the check comprises converting emitted second energy into a voltage profile and determining whether said voltage profile substantially matches an expected voltage profile.

* * * * *